United States Patent [19]

Kotzin et al.

[11] Patent Number: 5,708,969
[45] Date of Patent: Jan. 13, 1998

[54] REDUCED INTERFERENCE THROUGH FREQUENCY PARTITIONING

[75] Inventors: Michael Kotzin, Buffalo Grove; Eugene Bruckert, Arlington Heights, both of Ill.

[73] Assignee: Motorola, Inc., Schaumburg, Ill.

[21] Appl. No.: 186,834

[22] Filed: Jan. 25, 1994

Related U.S. Application Data

[62] Division of Ser. No. 797,628, Nov. 25, 1991, abandoned.

[51] Int. Cl.$^6$ .................................................. H04Q 7/38
[52] U.S. Cl. .................. 455/34.2; 455/33.1; 455/34.1; 455/63
[58] Field of Search .................... 455/33.1, 33.4, 455/34.1, 62, 63, 67.3, 67.6, 69–70, 50.1, 53.1, 54.1, 34.2, 56.1, 33.3, 33.2; 379/60, 63, 59

[56] References Cited

U.S. PATENT DOCUMENTS

| | | | |
|---|---|---|---|
| 4,144,496 | 3/1979 | Cunningham et al. | 455/33.3 |
| 4,310,722 | 1/1982 | Schaible | 455/33.1 |
| 4,435,840 | 3/1984 | Kojima et al. | 455/33.1 |
| 4,747,101 | 5/1988 | Akaiwa et al. | 379/59 |
| 4,794,635 | 12/1988 | Hess | 379/60 |
| 5,003,619 | 3/1991 | Morris et al. | 455/69 |
| 5,038,399 | 8/1991 | Bruckert | 455/62 |
| 5,140,695 | 8/1992 | Yasuda et al. | 455/34.1 |
| 5,203,008 | 4/1993 | Yasuda et al. | 455/33.1 |
| 5,287,544 | 2/1994 | Menich et al. | 455/33.1 |
| 5,301,359 | 4/1994 | Van Den Heuvel | 455/34.1 |

FOREIGN PATENT DOCUMENTS

| | | |
|---|---|---|
| 69606/81 | 2/1985 | Australia. |
| 0308253 | 3/1989 | European Pat. Off. ............... 455/63 |
| 3295324 | 6/1992 | Japan. |
| 9004293 | 4/1990 | WIPO .................................. 455/33.1 |

OTHER PUBLICATIONS

Proceedings of IEEE Vehicular Technology Conference, vol. 33, 1983, pp. 322–327, Halpern 'Reuse partitioning in cellular systems', p. 323, left column, line 1–line 30, p. 324, right column, line 65–line 67.

*Primary Examiner*—Nguyen T. Vo
*Attorney, Agent, or Firm*—Richard A. Sonnentag

[57] ABSTRACT

A method of reducing interference within a cellular system (10) by partitioning a designated frequency spectrum within a service coverage area (11, 12, 13, 14, 15, 16, or 17) into a first and at least second spectrum inclusive of the designated frequency spectrum and each with an associated power level. Assignment of communication units to a spectrum and power level are based upon distance from the base site (as determined through signal strength measurements). The spectral content of spectra in adjacent service coverage areas is adjusted to include non-coincidental frequencies.

8 Claims, 4 Drawing Sheets

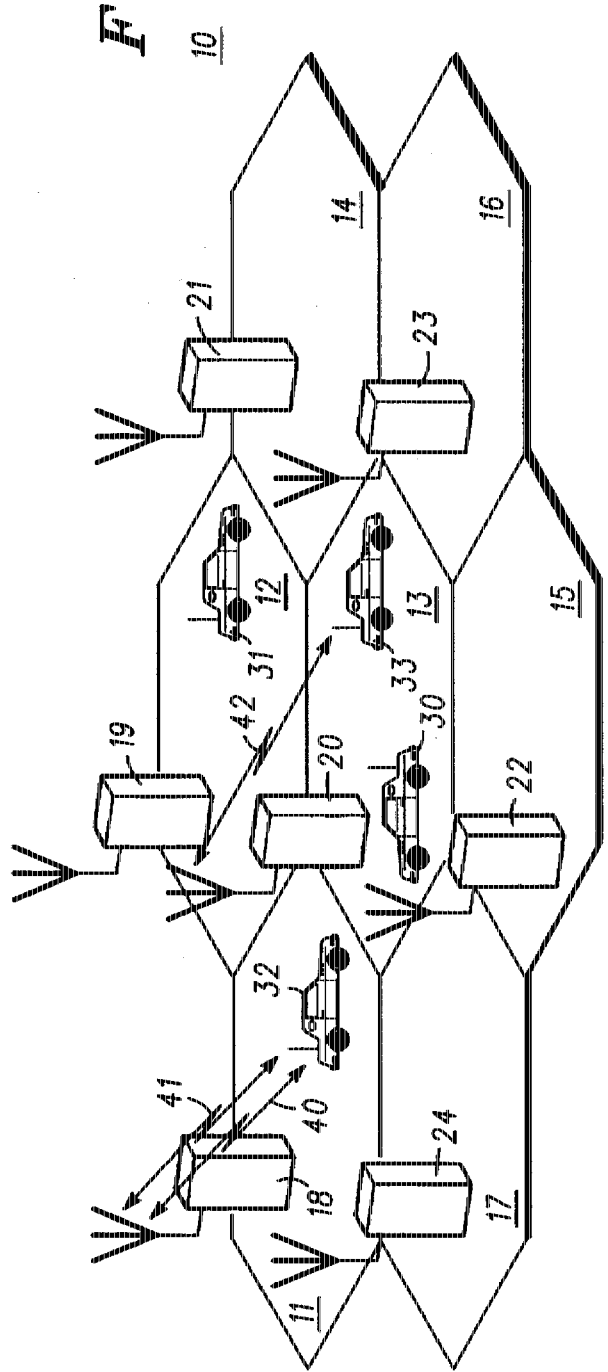
FIG.1
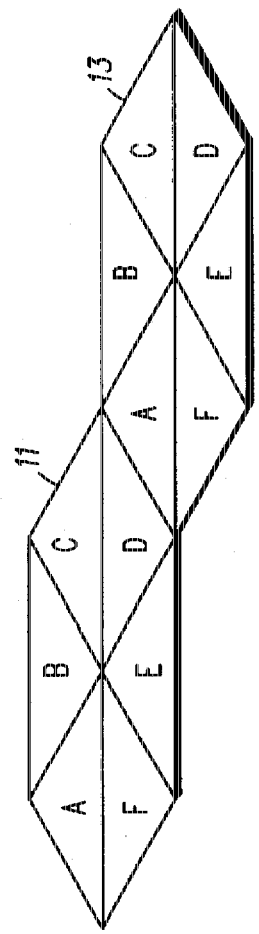
FIG.4
C=CLOSE
M=MEDIUM
F=FAR
FIG.3

REDUCED INTERFERENCE THROUGH FREQUENCY PARTITIONING

This is a divisional of application Ser. No. 07/797,628 filed on 25 Nov. 1991, now abandoned.

FIELD OF THE INVENTION

This invention relates to communication systems and more specifically to cellular communication systems.

BACKGROUND OF THE INVENTION

Cellular radiotelephone systems are known. Such systems, typically, provide communication access to subscriber units (cellular radiotelephones) within a number of service coverage areas (cells) on an assigned frequency spectrum. The assigned frequency spectrum is divided into a number of operating frequencies ($f_1, f_2, \ldots f_{7n+7}$).

To maximize the capacity of a radiotelephone system within a given geographic area, operating frequencies must be reused among the cells in such a manner that mutual interference does not exceed a maximum threshold level. Mutual interference, within such systems, is maintained below the maximum threshold level through the use of a reuse pattern.

Mutual interference is typically considered as arising from two sources. One source is co-channel interference and occurs when two cellular radiotelephones transmit on the same frequency. The second source is called adjacent channel interference. Adjacent channel interference typically arises when two radiotelephones operating on adjacent channels attempt to transceive a signal with a cellular base site from different areas of the cell (one near the base site the other near the fringe of the cell). In such a case the magnitude of a received signal from the radiotelephone near the base site "blinds" the base to a signal from the fringe.

The reuse pattern controls co-channel interference by maintaining a minimum distance between reusing base sites. The minimum distance under the reuse pattern is typically specified in terms of cell radius (see Graziano, U.S. Pat. No. 4,128,740).

The reuse pattern controls adjacent channel interference by sequentially assigning frequencies within the cellular system so as to avoid assignment of adjacent channels to the same, or adjacent, cells. Limitations on the use of adjacent frequencies in adjacent cells arises because, by the nature of cells in cellular telephony, a radiotelephone in a first cell may be nearer a base site in a second cell than another radiotelephone operating from within the second cell.

Because of limited communication spectrum and the importance of radio communications a need exists for a method to reduce both co-channel and adjacent channel interference. Such a method should simplify reuse patterns among cells within a geographic area.

SUMMARY OF THE INVENTION

A method of assigning communication resources within a cell of a cellular communication system is offered. The method includes the steps of grouping communication units based upon a signal metric indicative of distance from a base site of the cell and assigning the grouped communication units to group subspectra that includes a distal subspectrum, reserved for distal communication units, which is non-coincidental with distal subspectra of adjacent cells.

The metrics under which signal sources are grouped may be a signal quality factor such as signal strength or a bit error rate. The metric may also be a timing advance factor.

BRIEF DESCRIPTION OF THE DRAWING

FIG. 1 depicts seven cells of a cellular communication system under the invention including base station sites and communication units.

FIG. 3 depicts two cells within a communication system using sectored antennas.

FIG. 4 depicts a frequency partitioning, scenario under the invention within a designated frequency spectrum.

DETAILED DESCRIPTION OF A PREFERRED EMBODIMENT

Figure 9A:
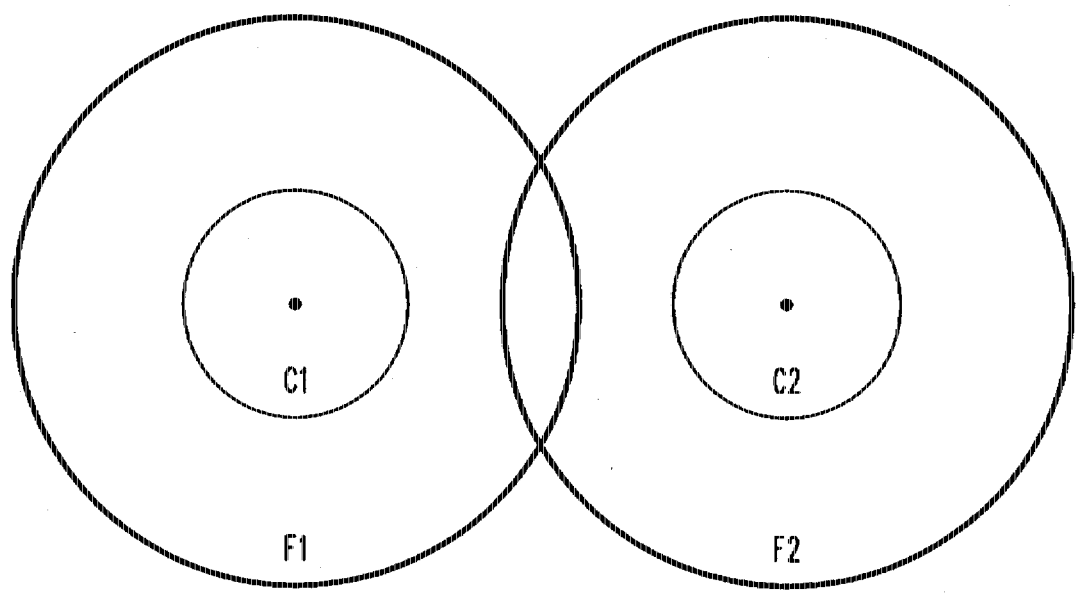
FIG. 9a depicts two cells using a partitioned spectrum.
Figure 9B:
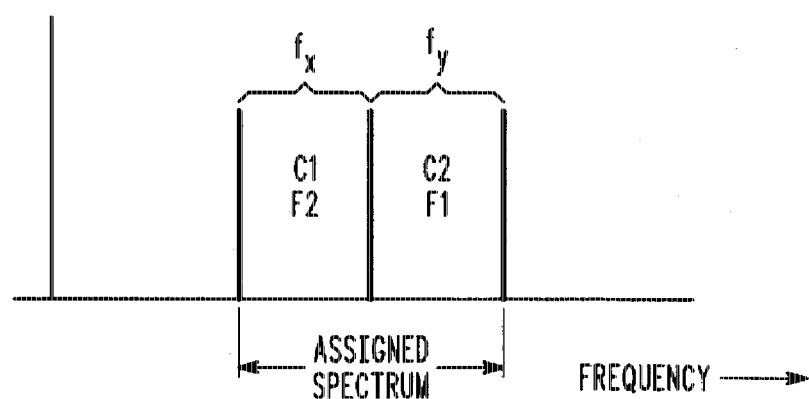
FIG. 9b depicts a partitioned spectrum.

The solution to the problems caused by co-channel and adjacent channel interference lies, conceptually, in further subdividing the frequencies used within each cell into complementary sets of "near", low powered frequencies and "far", high power frequencies (FIGS. 9a and 9b). Certain frequencies ($f_x$) would be allocated in a complementary fashion to nearer, lower powered transmissions in one cell and allocated to farther, higher powered transmissions in an adjacent cell, while other frequencies (fy) are allocated to farther, higher powered transmissions in the one cell and allocated in a complementary fashion to nearer, lower powered transmissions in the adjacent cell. This could result in the further beneficial effect of increasing the reuse of frequencies by reducing the effective diameter of each cell and, therefore, the diameter of the reuse pattern (i.e., the co-channel reuse distance).

Two adjacent cells will be discussed first, for ease of understanding, but, in practice, at least three coordinated, complementary cells comprise the planar reuse pattern (FIG. 5) and they are subdivided into mutually exclusive frequency sets: close, midrange, and far (Ø1, Ø2, and Ø3, FIG. 4).

The closeness or distance of a mobile can be determined from various conventional characteristic properties such as received signal parameters. Since Received Signal Strength Indication (RSSI) is a function of distance, RSSI can be used. In pseudo-synchronous systems, timing advance information can be utilized. These distance-related measurements (signal metrics) are then utilized to subdivide the radiotelephone population into relatively near, midrange, and distal users and the frequency spectrum ($f_1, f_2, \ldots f_{7n+7}$) allocated among them accordingly. Alternatively, mobiles equipped to measure signal strength themselves could assist by organizing themselves to scan for the closest (highest) powered frequencies from among adjacent (measured) cells.

Adjacent channel interference is suppressed by assigning adjacent channels to the same complementary set of frequencies (group spectrum) and limiting maximum power levels within each group spectrum. Assignment of similar power levels to adjacent frequencies ensures that adjacent channel interference is minimized.

Shown in FIG. 1 is a depiction of a communication system (10) in accordance with the invention. As shown the communication system (10) is divided into a number of cells (11 through 17). Each cell (11 through 17) provides communication services to communication units (30 and 33) from a centrally located base station base site (18 through 24).

Figure 2:
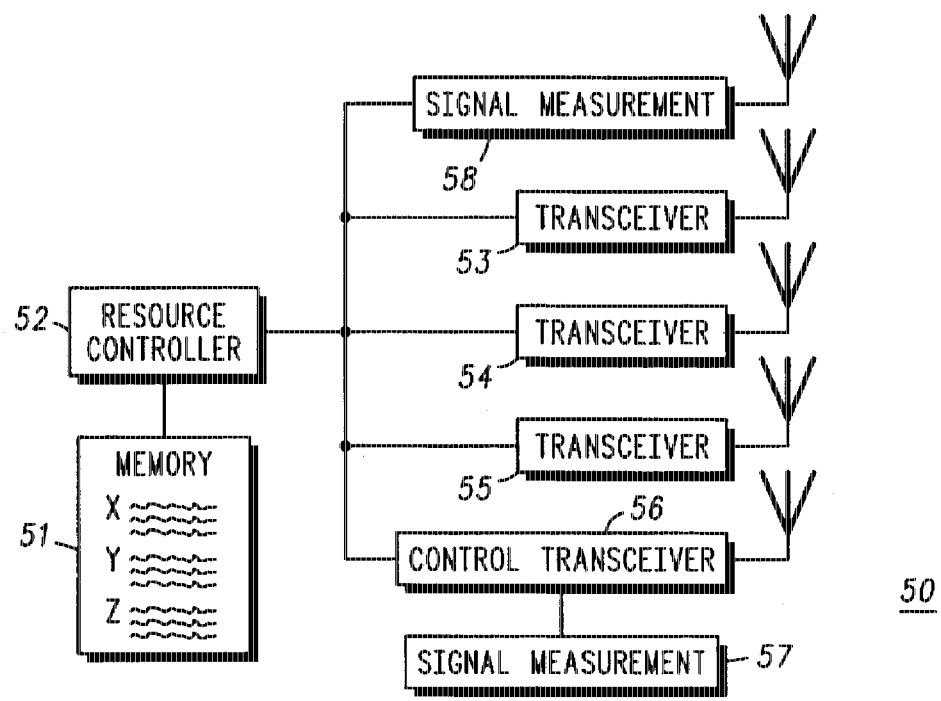
FIG. 2 comprises a block diagram of a base station site under the invention.

Shown in FIG. 2 generally is a block diagram of a base station site (50). Included within the base station site (50) is a resource controller (52) and associated memory unit (51), a number of transceivers (53 through 55), a signal measurement device (58), a control transceiver (56), and associated, second signal quality measurement device (57).

The communication units (30 through 33) and base station sites (18 through 24) in one embodiment of the invention are constructed to exchange communicated messages under a single channel per carrier (SCPC), frequency division multiple access (FDMA) format and may individually comprise a means for communicating under in such a manner. Control information and audio information under the embodiment may be combined and exchanged under appropriate signalling protocols by the base station sites (18 through 24) by transceivers (53 through 55). Resource requests and resource allocation between base station sites (18 through 24) and communication units (30 through 33) may be exchanged on a control resource through a control transceiver (56) reserved for that purpose.

In another embodiment of the invention, communication units (30 through 33) and base sites (18 through 24) may be constructed to exchange communicated messages under alternative access and encoding techniques, including but not limited to, time division multiple access (TDMA), code division multiple access (CDMA), direct sequence spread spectrum (DSSS), or frequency hopping spread spectrum, etc.. The invention disclosed herein will be described primarily in terms of an FDMA format. Where appropriate, details will be disclosed to provide the reader with sufficient detail to apply the invention under alternative encoding systems (e.g. DSSS, CDMA, or TDMA).

Figure 7:
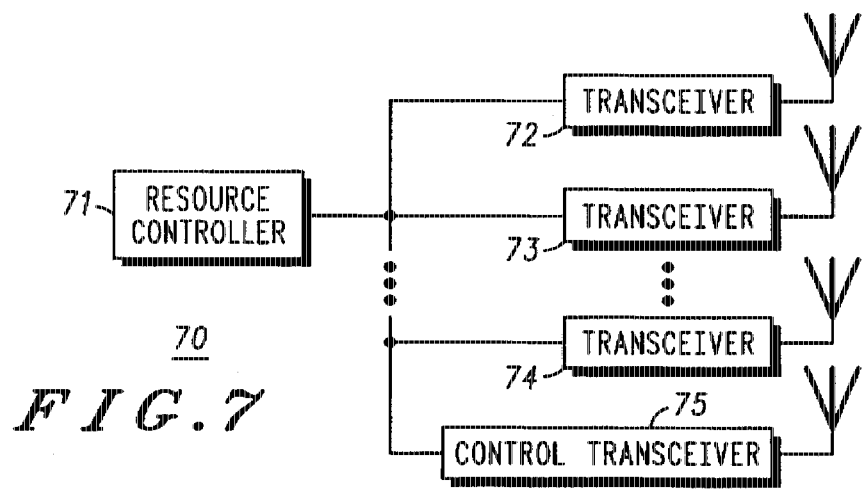
FIG. 7 comprises a block diagram of a base site under one embodiment of the invention.
Figure 6:
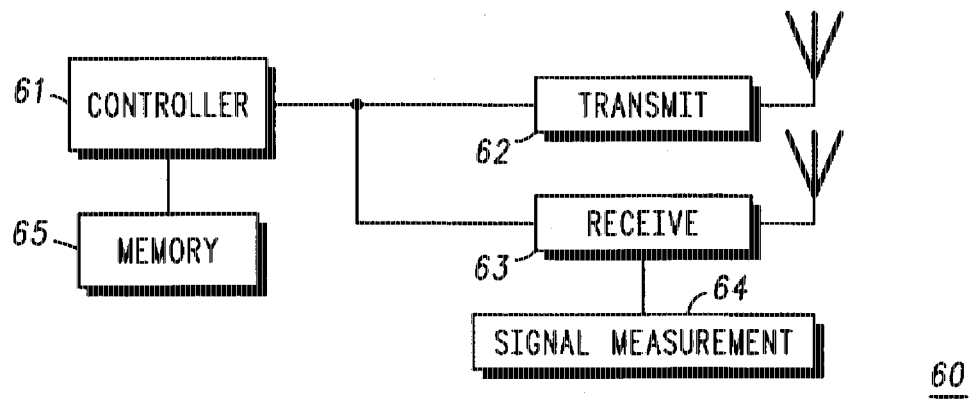
FIG. 6 comprises a block diagram of a communication unit under the invention.

The individual blocks shown in the figures (FIGS. 2, 6, and 7) are well known in the art. No further explanations need be or will be offered relative to the blocks within FIGS. 2, 6, and 7 other than where appropriate to assist with further understanding of the invention.

Figure 8:
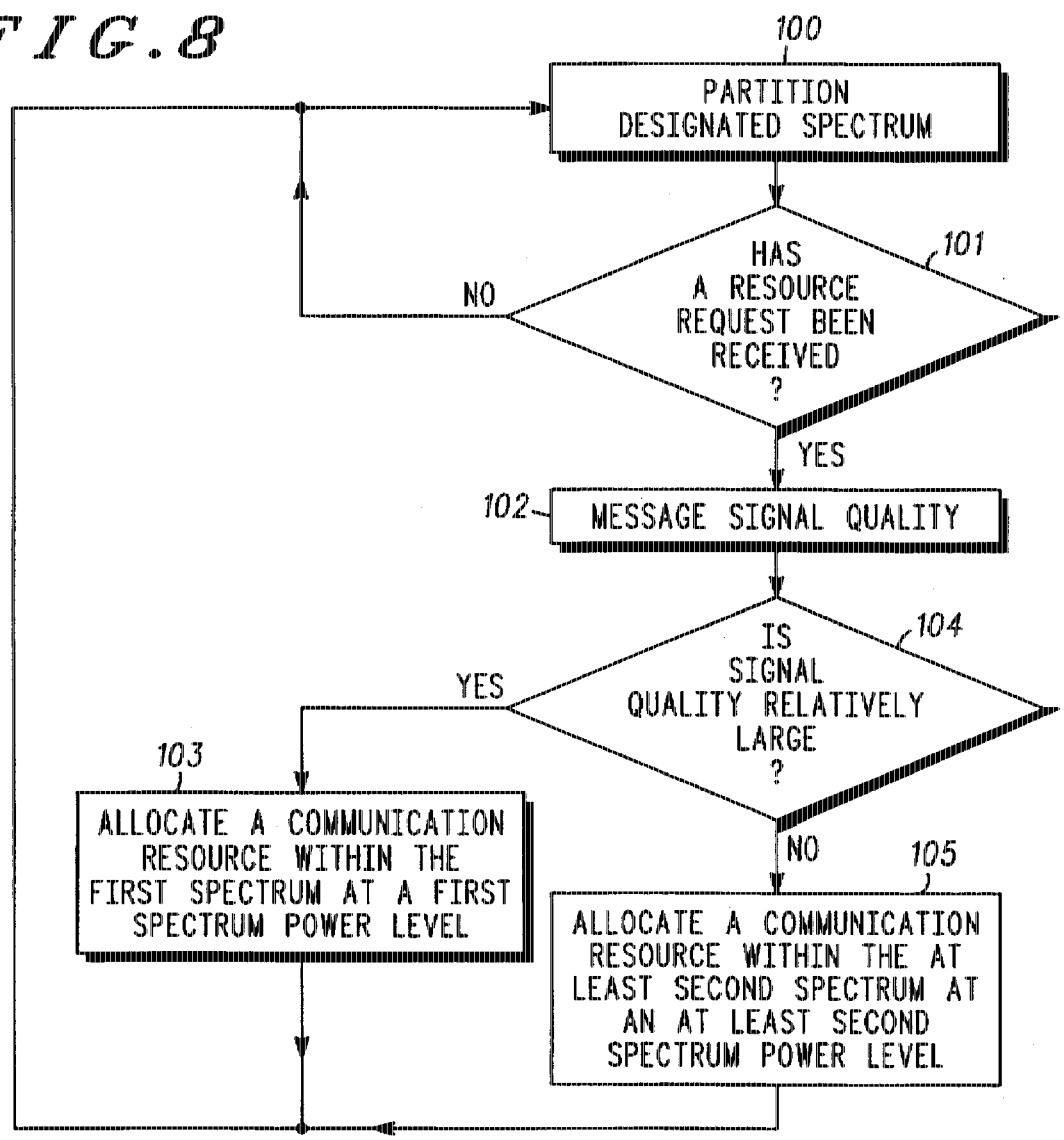
FIG. 8 depicts a block diagram of the method of resource assignment under the invention.

Shown in FIG. 8 is a flow chart describing the method of resource assignment, under the invention, of grouping signal sources together having more similar than dissimilar signal metrics. The signal sources may be communication units transmitting access requests to a base site, or exchanging a communicated signal through the base site. The metric, under which signal sources are grouped, as described above, may be RSSI or bit error rate. The metric may also be timing advance information.

The method of resource assignment further includes assigning the grouped signal sources to group spectrums, such that mutual interference (co-channel and adjacent channel) is avoided. Grouping of signal sources, under the invention, may be accomplished by measuring the signal metric, comparing the metric with a threshold, and allocating a communication resource within a group spectrum based upon the result of the comparison. Group spectra are identified by subdividing (partitioning) the frequencies used within each cell (designated frequency spectrum). Group spectrums, under the invention, are mutually exclusive sub-spectra of the designated frequency spectrum. Reference will be made to the flow chart as necessary in describing the method of the invention.

Upon start-up of a base site (50), ID numbers (not shown) of frequencies (communication resources) to be used within the service coverage area (11 through 17) served by the base site (50) are entered into a memory (51).

In one embodiment of the invention the memory (51) is divided (100, FIG. 8) into at least two sub-elements (X and Y) (for purposes of identifying the at least two group spectra or complementary frequency sets). Memory sub-elements (X and Y) contain IDs of communications resources to be assigned to requesting communication units (30 or 31) based upon distance from the base station base site (18 through 24) as determined by the relative magnitude of an output from a metric measurement device (57).

Communication resources assigned (100, FIG. 8) to memory location X comprise a first group spectrum (X) and communication resources entered into location Y comprise a second group spectrum (Y). In a service coverage area (11 through 17) served by a first and second spectrum (X and Y) assignment of communication resources under the invention is based upon comparison of a measured metric with threshold values.

The first spectrum (X) is reserved for communication units close to the base station site (18 through 24) and has a relatively large, first threshold value associated with the first spectrum. The second spectrum (Y) is reserved for communication units (30 through 33) operating relatively far from the base station site (18 through 24) and has a relatively small, second threshold value associated with the second spectrum (Y). The relatively small threshold value associated with the second spectrum (Y) is indicative of the requirement that while a communication unit (30 through 33) may be operating relatively far from the base station site (18 through 24) that the communication unit must still be within the service coverage area (11 through 17) of the base station site.

The measured metric is compared with the thresholds of the first and second spectra (X and Y) wherein each spectrum has associated with it a threshold value of increasing magnitude with the largest magnitude threshold associated with the spectrum proximate to the base station site. A communication resource is then allocated for use to the requesting communication unit (30 through 33) from within a spectrum (X or Y) of the first and at least second spectrum having the largest magnitude threshold exceeded by the measured metric. The communication resource is allocated by a means for allocating such as a resource controller (52) located at a base site (18 through 24).

Associated with memory sub-elements (X and Y) is a nominal power magnitude and power range. The memory sub-element (Y) associated with resource requests detected to be of the greatest distance from the base site (50) are assigned the highest magnitude operating power. Memory element (X) associated with resource requests close to the base site (50) may be assigned the lowest magnitude operating power. (Operating power for purposes of the invention shall include both base station site and communication unit operating power.) Signal levels of communication units (30 or 31), as detected by the base site (50), are controlled by power level commands transmitted by the base site (50) to be within the power range associated with the memory sub-element (X or Y) from which the communication resource originated as necessary to maintain adequate signal reception.

Under one embodiment of the invention the communication system (10) may be constructed to transmit under a DSSS or CDMA format within a designated frequency spectrum. The designated frequency spectrum is partitioned into a first and second group spectrum inclusive of the designated frequency spectrum.

Partitioning of the designated frequency spectrum may occur through operation of a means for partitioning the designated frequency spectrum into a first and an at least second spectrum inclusive of the designated frequency spectrum. In one embodiment of the invention the means for partitioning may be comprised of a service technician (not shown) entering parameters within memory (51) identifying a designated frequency spectrum and partitioning parameters. In another embodiment of the invention the means for partitioning may be comprised of the resource controller (52). In such an embodiment the resource controller (52) contains program software providing partition parameters for the first and at least second spectrum based upon a partitioning algorithm.

The means for partitioning the designated frequency spectrum may also include a means for adjusting the partitioning of the designated frequency spectrum based upon base station site loading. The means for adjusting the partitioning may, likewise, be comprised of a service technician (not shown) entering parameters within memory (51) adjusting parameters of the first and at least second spectra based upon a perception, by the technician, of base station site loading. In another embodiment the means for adjusting the partitioning may also be comprised of the resource controller (52). In such an embodiment the resource controller (52) contains program software providing adjustments of the parameters of the first and at least second spectrum based upon calculations of base station site loading within the service coverage area (11 through 17) of the base station site (18 through 24).

The means for adjusting the first and at least second spectrum may also include a means for calculating the loading of the base station site (18 through 24). The means for calculating the loading may be comprised of the resource controller (52). In such an embodiment the resource controller (52) contains program software calculating a loading factor based on data contained within memory (51) of communication transactions per time frame within the service coverage area (11 through 17) of the base station site (18 through 24).

For purposes of explanation the means for partitioning will be assumed performed by a technician at start-up and assumed to be constant under normal operating conditions. Under the embodiment (a constant set of parameters identifying a first and an at least second spectrum), service is offered within the cells (11 through 17) through sectored antennas (not shown) located at the base site (18 through 24). The sectored antennas divide the cells (11 through 17) into at least six service coverage areas (A through F, FIG. 3). Each sectored antenna (A through F) provides service within the service coverage area (A through F) from one of six base station sites (50) located at each base site (18 through 24) and coordinated by a site controller (not shown).

Through the use of sectored antennas, signals originating within a service coverage area (A through F) is transceived through a sectored antenna serving the area. Signals originating outside the service coverage area (A through F) are attenuated through use of the sectored antenna. Because of the use of the sectored antenna within such a system (10) the only source of interference for a service coverage area (D, FIG. 3) is an opposite sector (A) in an adjacent site.

To reduce interference within such a system (10) through frequency partitioning, adjacent (non-concentric) service coverage areas (A and D), (E and B), and (F and C) are assigned the opposing (non-coincidental) spectrum, of the first and second spectrum. The first spectrum is arbitrarily assigned for use in cell 11, sector D, for use by requesting communication units (30 through 33) operating relatively close to the base site (18) at relatively low power. The first spectrum (distal spectrum) is assigned for use in cell 13, sector A, for use by requesting communication units (30 through 33) operating relatively far from the base site (20) (distal units) at relatively high power (distal communication units). The process of assignment may be repeated in remaining adjacent service coverage areas (E and B), and (F and C). The second spectrum is similarly assigned within adjacent service coverage areas (A and D), (E and B), and (F and C).

Within such a system (10), and upon receipt of a service request (40, FIG. 1) (101) through the sectored antenna (D) in cell 11, a base station site (50) measures (102) a metric of the signal through the use of the signal measurement device (57). The magnitude of the measurement by the signal measurement device (57) is compared (104) to a threshold value contained within memory (51) to determine the status of the signal as a relatively weak signal or a relatively strong signal.

If the service request (40) is determined to be a relatively strong signal (communication unit (32) proximate to base site (18)) then the resource controller (52) responds with a resource allocation (40) (103) of the first spectrum and a relatively low power level. Upon receipt of the resource allocation (40) the requesting communication unit (32) tunes to the allocated resource and begins transceiving a signal (41).

Upon transmitting a resource allocation to the requesting communication unit (32) the resource controller (52) also allocates a transceiver (53) to service the communication transaction. The resource controller (52) also, periodically during the communication transaction, performs secondary measurements of signal quality through use of a signal quality measurement device (58). The secondary signal quality measurements are used by the resource controller (52) to adjust the transmission power of the communication unit (32) within a power range assigned to the spectrum, during the communication transaction to maintain adequate signal quality.

If, during the communication transaction between the communication unit (32) in cell 11, a resource request (42) from a second communication unit (33) were received in cell 13, sector A, then a similar procedure may be used. In the figure (FIG. 1) the communication unit (33) is shown to be near the edge of the service coverage area (sector A, cell 13). Upon receipt of the resource request (42) a signal measurement is performed by the signal measurement device (57) as above.

Because the requesting communication unit (33) is near the edge of the coverage area (A) the signal measurement would register a relatively weak signal. Comparison of the signal with the threshold in cell 13 would require that the resource controller (52) in cell 13 allocate (105) a communication resource in the second spectrum (distal spectrum) at a relatively high power level.

Under the invention an identical frequency-range DSSS or CDMA communication resource may be used simultaneously by both communication units (32 and 33). The proximity of communication unit 32 to the base site 18 and the relatively low power levels used in cell 11 in transceiving a signal do not represent a source of significant interference to communication unit 33 operating in cell 13 at a relatively high power level. For the same reasons communication unit 33 operating in cell 13 at a relatively high power level does not represent a significant source of interference in cell 11 to the communication transaction between communication unit 32 and the base site (18).

In another embodiment of the invention within a communication system (10) an omnidirectional antenna and a single base station site (52) are used at each base site (18 through 24). Service coverage areas are coextensive with cell area. Under this embodiment the designated frequency spectrum is divided into a first, a second and a third spectrum, inclusive of the designated spectrum.

The first, second, and third spectrum in this embodiment are assigned, as above, based upon a metric measurement performed by the metric measurement device (57), in this embodiment compared to a first and a second threshold.

If a requesting communication unit (32) presents a signal with a measured metric above the second threshold the communication unit (32) is determined to be close and is assigned the spectrum (designated by the letter "C") of the first, second, or third spectra reserved for nearby communication units operating at low power. A communication unit (30 through 33) presenting a signal between the first and second threshold may be assigned the spectrum (designated by the letter "M") of the first, second, or third spectra reserved for midrange distances from the base site (18 through 24). A communication unit (30 through 33) presenting a signal below the first threshold may be assigned the distal spectrum (designated by the letter "F") reserved for a distal end of the service coverage areas (cells 11 through 17) from the serving base site (18 through 24).

Shown in FIG. 4 is a depiction of partitioning of a designated frequency spectrum used within a communication system (10). Shown (FIG. 4) on the ordinate is a cell number and across the abscissa is a representation of frequency. As shown the first, second, and third spectra (designated by the letters "C, M, and F") may be used as contiguous frequency ranges or divided into non-contiguous bandwidths and used as such as separate DSSS communication resources.

Figure 5:
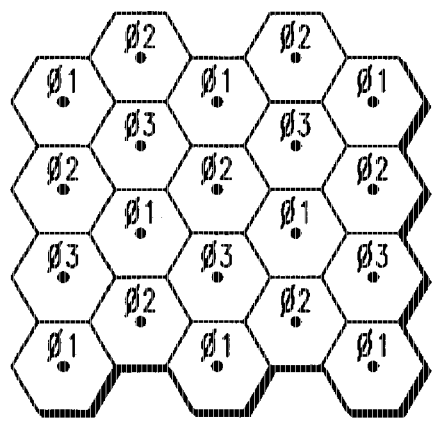
FIG. 5 depicts reuse of a frequency partitioning scenario under the invention within a cellular system.

Shown in FIG. 5 is a depiction of a reuse pattern under the invention using the partitioning scheme of FIG. 4. As shown adjacent service coverage areas of adjacent service coverage areas (cells 11 through 17) are served by substantially non-coincidental frequencies of the designated frequency spectrum.

In another embodiment of the invention a communication system (10) is constructed to operate under an FDMA format with six sectored antennas and six base station sites (52) per base site (18 through 24). Communication resources are comprised of a transmit and receive frequency, each with a bandwidth, and an FM transmitting technique.

Under this embodiment the designated frequency spectrum consists of a number of frequency-adjacent communication resources situated within the designated frequency spectrum. The designated frequency spectrum in this embodiment is comprised of first and second spectra that may be substantially equal in bandwidth and inclusive of a designated frequency spectrum. Segregation of frequency-adjacent communication resources to a first and second spectrum reduces spectral overlap through use of a substantially constant nominal power level assigned to the spectrum.

Allocation of communication resources under this embodiment occurs as above for the DSSS embodiment through comparison of a signal measurement with a signal threshold stored in memory.

In another embodiment of the invention within an FDMA communication system (10) base sites (18 through 24) are constructed with omnidirectional antennas and a single base station site (50) per base site (18 through 24). A designated frequency spectrum containing adjacent channel communication resources is partitioned as in FIG. 4. Spectral overlap is reduced through substantially equal adjacent channel power levels. A reuse factor between cells (11 through 17) is reduced through the substantially non-coincidental frequency communication resources allocated in adjacent service coverage areas.

In another embodiment of the invention base station sites (18 through 24) partition a designated frequency spectrum as above and transmit information identifying a first and an at least second group spectrum on a control transceiver (75, FIG. 7) in the form of a beacon for the benefit of communication units (30 through 33). The beacon transmitted by the base station sites (18 through 24) transmits along with identities of the first and at least second spectrum threshold values and power magnitudes associated with each spectrum.

A communication unit, shown generally (60, FIG. 6), is constructed to first select the strongest beacon from a nearby base station site (18 through 24), decode the information, and select a communication resource based upon such information. The communication unit (60) selects the strongest beacon from the nearest base station site (18 through 24) by scanning a designated frequency spectrum enter into a memory (65) and measuring the relative magnitude of beacons through use of a signal measurement device (64).

Upon identifying and tuning to the strongest beacon, the communication unit (60) decodes the information and compares the measured value of the beacon signal strength with the decoded beacon threshold values. Based upon the comparison of beacon signal strength with threshold values the communication unit selects a spectrum of the first or at least second spectrum as described in previous embodiments and seizes a communication resource within the spectrum of the first or at least second spectrum through activation of a means for seizing a communication resource. (The controller (61) and transmitter (62) together, in this embodiment, comprise a means for seizing a communication resource.)

The communication unit (18 through 24) then initiates a communication transaction on the seized resource at the power provided by the decoded beacon information. Transceivers (72 through 74) are provided to service communication transactions on each of the first and at least second spectrum of the designated frequency spectrum.

We claim:

1. A method of reducing interference within a cellular communication system having a plurality of base station sites, at least two base station sites of the plurality of base station sites being assigned communication resources in a commonly designated frequency spectrum based on a spectral reuse pattern and providing communication services within the commonly designated frequency spectrum to user communication units located within a corresponding service coverage area of each base station site, the method comprising the steps of:

A) partitioning, at a base station site of the at least two base station sites, the commonly designated frequency spectrum into at least two group spectrums;

B) transmitting, by the base station site, a beacon signal containing information that identifies the at least two group spectrums, a spectrum threshold for each of the at least two group spectrums, and a spectrum power level for each of the at least two group spectrums;

C) receiving by a communication unit, the beacon signal, decoding the information and measuring a signal metric of the beacon signal;

D) comparing the signal metric with at least a first relative magnitude threshold; and E) seizing, by the communication unit, from the base station site a communication resource that is within a group spectrum of the at least two group spectrums having a relative magnitude threshold of the at least a first relative magnitude threshold exceeded by the signal metric.

2. The method as in claim 1 further including the step of performing, by the base site, secondary signal quality measurements of communication unit communication transactions and maintaining adequate signal quality by instructing the communication unit to adjust a transmission power within a spectrum power range.

3. The method as in claim 1 wherein the step of partitioning the commonly designated frequency spectrum further includes the step of adjusting the partitioning of the commonly designated frequency spectrum based upon base station site loading.

4. The method as in claim 3 wherein the step of adjusting the partitioning further includes the step of calculating system loading based upon data contained within memory.

5. A device for reducing interference within a cellular communication system having a plurality of base station sites, at least two base station sites of the plurality of base station sites being assigned communication resources in a commonly designated frequency spectrum based on a spectral reuse pattern and providing communication services within the commonly designated frequency spectrum to user communication units located within a corresponding service coverage area of each base station site, the device comprising:

A) means, at a base station site of the at least two base station sites, for partitioning the commonly designated frequency spectrum into at least two group spectrums;

B) means for transmitting, by the base station site, a beacon signal containing information that identifies the at least two group spectrums, a spectrum threshold for each of the at least two group spectrums, and a spectrum power level for each of the at least two group spectrums;

C) means for receiving, by a communication unit, the beacon signal, decoding the information and measuring a signal metric of the beacon signal;

D) comparing the signal metric with at least a first relative magnitude threshold; and E) means for seizing: by the communication unit, from the base station site a communication resource that is within a group spectrum of the at least two group spectrums having a relative magnitude threshold of the at least a first relative magnitude threshold exceeded by the signal metric.

6. The device as in claim 5 further comprising means, at the base site, for performing secondary signal quality measurements of communication unit communication transactions and maintaining adequate signal quality by instructing the communication unit to adjust a transmission power within a spectrum power range.

7. The device as in claim 5 wherein the means for partitioning the commonly designated frequency spectrum further comprises means for adjusting the partitioning of the commonly designated frequency spectrum based upon base station site loading.

8. The device as in claim 7 wherein the means for adjusting the partitioning further includes means for calculating system loading based upon data contained within memory.

* * * * *